Sept. 14, 1943.  L. H. LOGUE  2,329,402
AGGLOMERATION OF CEREALS GRAINS
Filed Feb. 10, 1941
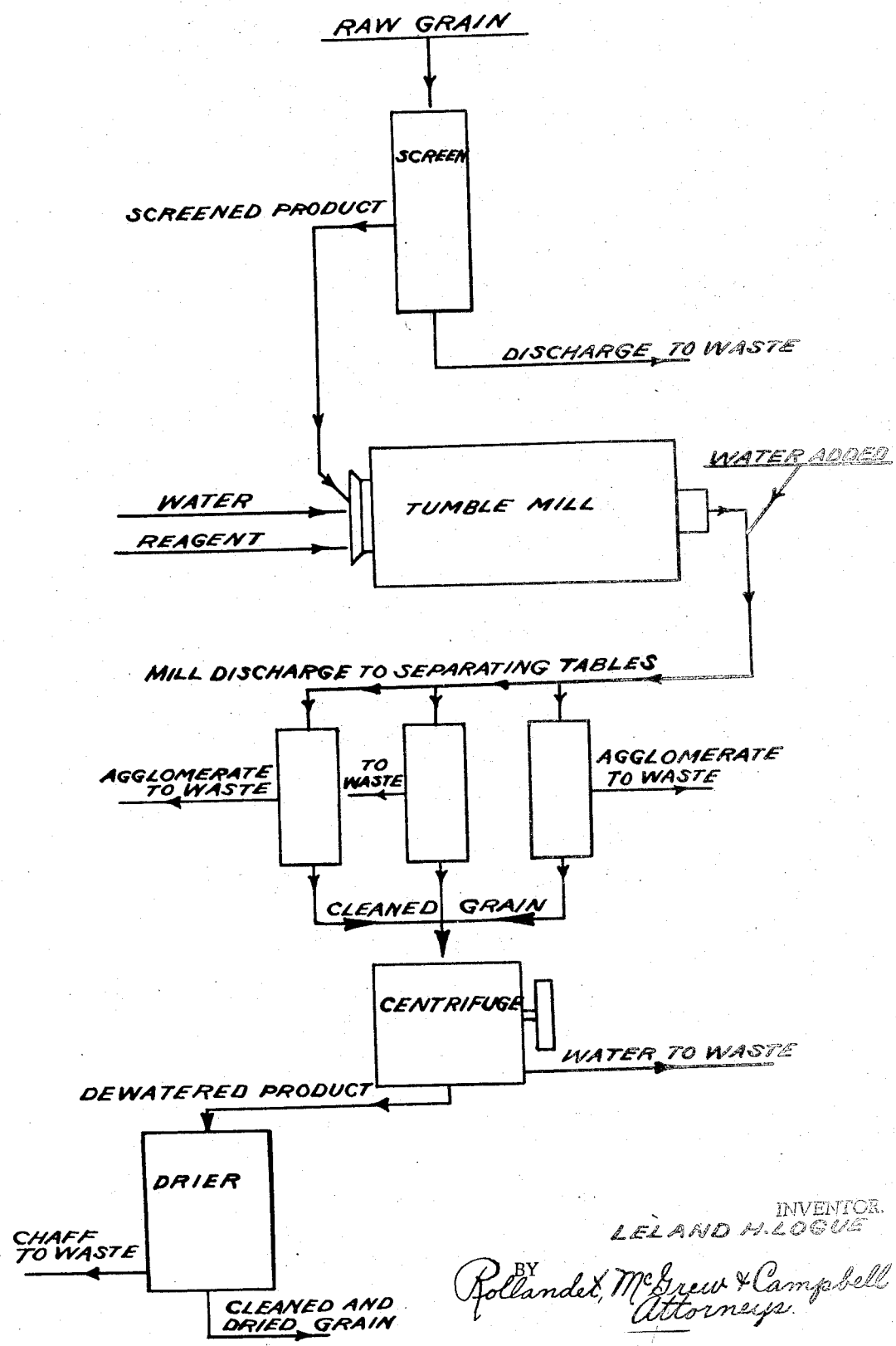
INVENTOR.
LELAND H. LOGUE
BY Rollandet, McGrew & Campbell
Attorneys.

Patented Sept. 14, 1943

2,329,402

UNITED STATES PATENT OFFICE 2,329,402

AGGLOMERATION OF CEREAL GRAINS

Leland H. Logue, Denver, Colo., assignor to Mining Process and Patent Company, Denver, Colo., a corporation of Delaware Application February 10, 1941, Serial No. 378,317

8 Claims. (Cl. 83—94)

This invention relates to the art of agglomeration and has as its primary object the treatment of cereal grains by efficient and cheap methods that will effectively remove contaminating matter from the grain.

Another object of the invention is to provide a method of treating grain which will improve its food value by the removal of waste matter or impurities therefrom.

A further object of the invention is to provide methods of purifying grain which require little operator control and are adapted for continuous operation.

Other objects reside in novel steps and treatments all of which will appear more fully in the course of the following description.

Cereal grains after harvesting usually are transported to elevators or the like where they are graded and stored, and subsequently portions thereof are processed to obtain prepared foods, flour and the like which is consumed by the public.

In the growing and harvesting operations much contaminating matter becomes mingled with the grain. Examples of such contaminants are soil, insects, insect eggs, weeds and fungus growth, and the like.

During subsequent shipment and storage the grain is further contaminated by contact with dirty surfaces and due to vermin which cannot be eliminated despite elaborate efforts to eliminate this nuisance.

As a consequence, the grain taken for processing usually contains appreciable quantities of matter unfit for human consumption which cannot be eliminated by methods now used by the industry.

Likewise, in certain treatments it is desirable to remove the outer skin of the grain constituting the true bran, and thus obtain a final product having a relatively high food value per unit of weight. For convenience of description, this matter will be classed herein as a contaminant.

However, it is possible to differentially separate the contaminating matter from the grain kernels by agglomerating methods. In so doing, the grain after separation is in condition for processing and thus is kept free of contaminants until it is finally packaged for distribution to the trade.

The accompanying flow sheet is cited as a typical example of the procedure to be followed in performing the process of the present invention. In this operation the grain is conditioned for treatment by mixing it with a liquid wetting medium and then in the presence of suitable agglomerating agents, the mixture is subjected to the action of a vibrating table. In this action, the wetter grain kernels tend to sink and travel along the riffles to the concentrates discharge, where they are collected, dewatered, and partially or completely dried, after which they may be passed to a suitable processing treatment.

The contaminants under the influence of the reagent and the vibration form flocs at the surface of the liquid suspension medium and these flocs, either with or without entrained air, ride along the surface of the liquid responding to the lateral travel thereof and are carried across the tailing discharge to be passed to waste.

The separation thus provided attains a high degree of efficiency as the waste product does not become wetted to a degree sufficient to initiate sinking tendencies and due to the reagent coating is subjected to artificial elevating impulses to aid its natural floatability.

In contradistinction, the grain kernels readily take up moisture from the wetting medium and under the influence of the vibration quickly descend into the riffles where they remain during their movement to the point of discharge at the opposite end of the table.

In preparing the material for such a separation, the grain taken for treatment preferably is first subjected to a coarse screening operation for the removal of wood chips, wire, bolts and the like. A rotary screen of a mesh large enough to pass all grain kernels may be used for this purpose and the screened product of this operation is taken to form the feed of the agglomeration treatment.

This screened product is next subjected to a conditioning treatment which preferably comprises mixing with a wetting medium such as water, and suitable reagents to assist the separation hereinbefore described. To this end, the grain is fed into a tumble mill and is mixed with sufficient water to form a semi-fluid mass. Preferably, such mill is provided with a rubber lining and carries a very low pulp level.

Reagent also is fed to the mill in a predetermined quantity. While considerable latitude is permitted, due to variations in the material under treatment and also in the character of the reagent selected, from one-tenth pound to five pounds of reagent per ton of grain will be sufficient for the intended purpose.

Where the purpose of the treatment is merely the removal of contaminating matter from the grain, the conditioning time will be of relatively short duration, from two to three minutes usually being sufficient. However, when the operation contemplates the removal of bran from the grain kernels, as well as the separation of contaminants, the conditioning time will be much longer and an interval up to twenty to twenty-five minutes may be employed.

The combination of the wetting medium and the agglomerating agent serves to soak the individual kernels and loosens the bran or outer skin, as either will so function individually. The tumbling action promotes attrition and the combined effect of these several influences is to separate the bran from the grain kernels in a relatively short conditioning time.

Various treatments of cereal grains have been described in my co-pending application of even date, Serial No. 378,318, entitled Cleaning of cereal grains, and features described but not claimed herein have been made the subjects matter of claims in the aforesaid co-pending application.

Following the aforesaid conditioning treatment, the discharge of the tumble mill preferably is diluted to place it in free-flowing condition, and while considerable latitude is permitted in the selection of pulp ratios, usually from three to four parts water to one part of grain by weight will give satisfactory results.

Due to the wetting given the grain kernels and the selective coating of the contaminating matter, the resulting composition is in ideal condition for differential separation of said constituents. The free flowing pulp is fed onto a vibrating table which may be the well-known "Wilfley table" or "Deister table," and under the action of the vibration the grain kernels readily sink into the riffles while the contaminating matter responding to the action of the reagent quickly forms flocs which ride along the surface of the liquid medium.

As a consequence, the separation previously described is obtained with a high degree of efficiency and as will be apparent to those skilled in the art, the arrangements described permit a continuous operation where this is desired.

If a large tonnage of material is subjected to treatment, it will be apparent that the feed to the concentrating tables may be separated by well known methods and a battery of such tables may be operated, all performing the above described separation.

The wetting medium used in the treatment usually is water which is well suited for the purpose, but whenever water is not available for the treatment, wetting agents or other solutions may be substituted therefor.

Various types of reagents may be taken for this purpose and such reagents may comprise both a frothing agent and an agglomerating agent, although under certain circumstances, a single composition will possess both frothing and collecting properties and may be used alone in the treatment.

Pine oil and certain saponaceous materials are well suited to perform the frothing function, and mineral oils such as fuel oil and fatty acid compositions such as oleic acid are well suited to perform the agglomerating function. Likewise, soaps may be used or various combinations of soap-forming materials, although where the grain is to be used for human consumption, the presence of the soap may leave an unpleasant taste and will be avoided on that account.

In the operation hereinbefore described, a mixture of pine oil as a frother and fuel oil or oleic acid within the range stated will give highly satisfactory results.

While the present process is well suited for the separation of various types of contaminating matter from grains, it is particularly adapted for the treatment of cereal grains such as wheat, barley, rye, corn and oats, particularly where such grains are to be used subsequently in foods for human consumption.

Although the treatment is intended primarily for the removal of matter unfit for human consumption, it also may be utilized in operations where the bran content or outer skin of the grain is separated from the grain kernels to produce a final product of relatively high food value.

In the separations hereinbefore described, a vibrating table has been referred to as producing the desired stratifying effect. However, it should be understood that the operation involves a wet stratifying classification and consequently other methods such as jigging and hindered settling classification or the like may be substituted for table concentration.

The action of the reagent on the oiled or filmed contaminant particles serves to form loosely bonded agglomerates in which air may or may not be present. However, such agglomerates either float or become segregated into an overlying stratum at the surface of the liquid medium which permits a clean separation from the grain kernels tending to sink as a consequence of the wetting action.

In the preliminary testing prior to commercial operation, the agglomerating action should be investigated with and without entrained air present. When the presence of air in the agglomerates is found to give an appreciably cleaner and better separation, it will be advisable to employ a method of hydraulic separation or classification which permits introduction of air or other gas into the treatment.

As the reagents used in the present invention are known as effective frothers and collectors in a variety of froth flotation operations and have an affinity for bran and contaminants but not for grain as hereinbefore described, their presence in a hydraulic separation insures collection of bran and contaminants at the surface while the wetted grain sinks. Thus a clean and efficient separation is insured.

Further, if gas is introduced into the treatment, the combined effect of the reagent and gas is to carry the bran and contaminant to the surface where such matter collects in flocs or as a scum or froth and is held there until subsequently removed by overflow or the like.

In the various operations described hereinbefore, the agglomerating action is particularly beneficial in collecting in the flocs certain contaminant constituents of sizes, shapes and specific gravity that are not separated by other methods. Such particles, if left in a dispersed condition, tend to adhere to the grain surfaces and consequently would pass into the final grain product. However, the conditioning treatment of the present method, coupled with the efficiency of the reagent, serves to bring such constituents into the flocs and thus permit their removal separate from the grain.

Changes and modifications may be availed of within the spirit and scope of the invention as defined in the hereunto appended claims.

What I claim and desire to secure by Letters Patent is:

1. The method of agglomeration, which comprises introducing cereal grain into an aqueous suspension vehicle, agitating said grain in the suspension medium for a sufficient interval to loosen and remove the outer skins from the grain, introducing into the material under treatment an agglomerating agent having frothing and collecting properties, aerating said material, inclusive of the agglomerating agent, with a quantity of gas insufficient to induce froth flotation but sufficient to form the loosened skins into agglomerates, and separating said agglomerates from the grain kernels in said liquid.

2. The method of agglomeration, which comprises introducing cereal grain into an aqueous suspension vehicle, agitating said grain in the suspension medium for a sufficient interval to loosen and remove the outer skins from the grain, introducing into the material under treatment an agglomerating agent having frothing and collecting properties, aerating said material, inclusive of the agglomerating agent, with a quantity of gas insufficient to induce froth flotation but sufficient to form the loosened skins into agglomerates, continuing such treatment for an interval sufficient to induce sinking of the wetted grain, and separately removing the sunken grain and the agglomerates.

3. The method of agglomeration, which comprises introducing cereal grain into an aqueous suspension vehicle, agitating said grain in the suspension medium for a sufficient interval to loosen and remove the outer skins from the grain, introducing into the material under treatment an agglomerating agent having frothing and collecting properties, aerating said material, inclusive of the agglomerating agent, with a quantity of gas insufficient to induce froth flotation but sufficient to form the loosened skins into agglomerates, subjecting the aerated matter to a hydraulic classification to maintain the agglomerates at or near the surface while the wetted grain is caused to sink, and separately removing the sunken grain and the agglomerates.

4. The method of agglomeration, which comprises introducing cereal grain into an aqueous suspension vehicle, agitating said grain in the suspension medium for a sufficient interval to loosen and remove the outer skins from the grain, introducing into the material under treatment an agglomerating agent having frothing and collecting properties, aerating said material, inclusive of the agglomerating agent, with a quantity of gas insufficient to induce froth flotation but sufficient to form the loosened skins into agglomerates, subjecting the aerated matter to a stratifying classification to maintain the agglomerates at or near the surface while the wetted grain is caused to sink, and separately removing the sunken grain and the agglomerates.

5. The method of agglomeration, which comprises introducing cereal grain into an aqueous suspension vehicle, agitating said grain in the suspension medium for a sufficient interval to loosen and remove the outer skins from the grain, introducing into the material under treatment an agglomerating agent having frothing and collecting properties, aerating said material, inclusive of the agglomerating agent, with a quantity of gas insufficient to induce froth flotation but sufficient to form the loosened skins into loosely bonded agglomerates, removing said agglomerates from the surface of the liquid, and removing the dehusked grain from the treatment at a point distant from said agglomerate removal.

6. The method of agglomeration, which comprises introducing a cereal grain containing contaminating matter into an aqueous suspension vehicle, agitating said grain in the suspension medium for a sufficient interval to loosen and remove the outer skins from the grain, introducing into the agitating treatment an agglomerating agent having frothing and collecting properties, aerating said agitated material with a quantity of gas insufficient to induce froth flotation but sufficient to form the loosened skins and contaminating matter into agglomerates, and separating said agglomerates from the grain kernels in said liquid.

7. The method of agglomeration, which comprises introducing a cereal grain containing contaminating matter into an aqueous suspension vehicle, agitating said grain in the suspension medium for a sufficient interval to loosen and remove the outer skins from the grain, introducing into the agitating treatment an agglomerating agent having frothing and collecting properties, aerating said agitated material with a quantity of gas insufficient to induce froth flotation but sufficient to form the loosened skins and contaminating matter into agglomerates, continuing the aerating treatment for an interval sufficient to induce sinking of the wetted grain, and separating said agglomerates from the grain kernels in said liquid.

8. The method of agglomeration, which comprises introducing a cereal grain containing contaminating matter into an aqueous suspension vehicle, agitating said grain in the suspension medium for a sufficient interval to loosen and remove the outer skins from the grain, introducing into the agitating treatment an agglomerating agent having frothing and collecting properties, subjecting the agitated material to a hindered settling treatment, inclusive of the introduction of a quantity of gas insufficient to induce froth flotation but sufficient to form the loosened skins and contaminating matter into agglomerates, continuing said hindered settling treatment until the grain kernels sink in the liquid, and separately removing the sunken grain and the agglomerates.

LELAND H. LOGUE.